Sept. 22, 1931.  J. SNEED  1,824,450
LINK
Filed Aug. 23, 1928
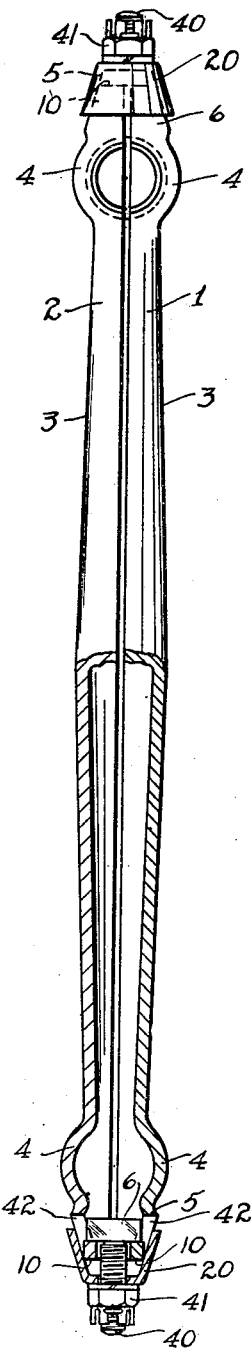
FIG_1
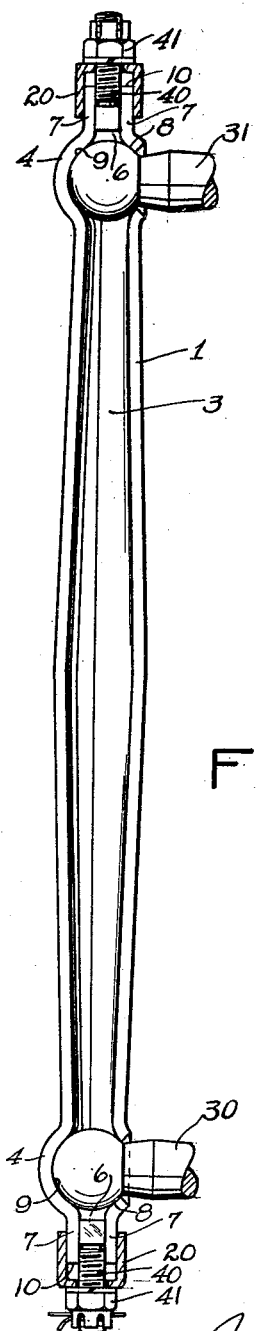
FIG_2

Patented Sept. 22, 1931

1,824,450

UNITED STATES PATENT OFFICE

JOHN SNEED, OF FERNDALE, MICHIGAN

LINK

Application filed August 23, 1928. Serial No. 301,949.

This invention relates to links or connecting rods and particularly to means for assembling and securing the component parts together.

In my copending application Serial No. 289,671, filed July 2nd, 1928, I have illustrated and described a link or tie rod formed essentially of two longitudinal halves and my present invention constitutes an improvement over my former invention, particularly in the manner and means of securing the parts of the link together.

It is among the objects of my invention to arrange a link which may be formed essentially of simple stampings which can be readily assembled. Another object is to arrange a link adapted for universal engagement with parts between which the link extends. A further object is to arrange a link having integrally formed sockets for ball and socket joints, the spacing of which may be varied to compensate for wear. A further object is to provide a link which will carry forces both in tension and compression. Another object is to provide a link formed essentially of longitudinally extending halves adapted to engage ball studs near its ends and having clamping means disposed beyond the sockets for engaging the ball studs so that forces in tension which tend to spread the halves of the link apart are restricted by the clamping means.

Other objects will appear from the following description of a preferred form of my invention, reference being had to the accompanying drawings. The essential characteristics are summarized in the claims.

In the drawings, Fig. 1 is a partially broken top plan view of the assembled link; and Fig. 2 is a side elevation of one of the halves of the link with the connecting members of the ends partly in section and with a partial showing of the ball-stud members between which the link extends.

My link comprises essentially a pair of equal longitudinally extending halves 1 and 2, each of which has a generally channeled body portion 3 and each of which has substantially half socket portions 4 near its ends. Extending beyond the socket portions, the ends of each half are formed with converging exterior surfaces 5. These surfaces may conveniently be the base or web of channeled extensions 6, see also Fig. 2, and in forming the link, I have illustrated in the preferred form of my invention that side flanges 7 of these channeled parts may be parallel and of decreasing depth toward the end of the link. I prefer that the side flanges 7 be arranged proximate each other to more completely form the socket along the surfaces at 8 and 9, and to engage a bolt as described below. The ends of the channeled part 6 are open and terminate along the surfaces 10.

Overlying and engaging each of the ends of the link are flattened pyramidal washers 20 which have inclined interior surfaces engaging the surfaces 5 of the ends of the separate halves of the link; as these members or washers are forced inwardly or toward the body of the link; the separate halves of the link are forced toward each other. Thus when such means as the ball studs 30 and 31 are engaged in the socket like parts of the link, the washers may be forced onto the ends of the link to grasp the balls and hold them as firmly as may be desired. If there be any wear between the balls and sockets, compensation may be had by forcing the washers 20 toward the body of the link.

To draw the washers 20 onto the ends of the link, bolts 40 having T-shaped heads are disposed within the channeled ends of the link and are held therein both against rotation and outward longitudinal movement. The bolts pass through the washers and such means as nuts 41 threaded on the bolts force the washers toward the body of the link and wedge the halves together. The T-shaped heads of the bolts 40 are engaged between the side flanges 7 of the channeled ends of the link, see Fig. 2 and held against rotation thereby. The ends of the heads of the bolts 40 extend into apertures 42, which are punched in the inclined bases of the channeled parts of the ends of the link and are thus held against outward movement.

As mentioned above, the opposite halves of the link 1 and 2 grasp between them the ball parts of the ball studs and engage the studs but permit universal movement between each stud and the link. The body portion of the halves may be substantially semi-circular in cross section and may have a greater diameter in the middle than at the ends to withstand stresses in compression. When the link is assembled the separate halves are intended to firmly engage the balls of the ball studs and the halves may be spaced apart slightly to permit the halves to be moved together to compensate for wear in the ball and socket joints.

From the foregoing it will appear that I have provided a link which is eminently simple in design and construction, and may be easily made and readily assembled. Each of the halves of the link may comprise a simple stamping made in one operation from sheet stock. Assembling the link, consists in positioning the T-bolts between the halves when they are put together and thereafter forcing the washers 20 over the separate halves and holding the washers in the desired position by nuts which cooperate with the T-bolts.

I conceive that the uses of my link are manifold and that it may be adapted by changes in size and thickness of stock without departing from the spirit of my invention to such duties as for instance, the tie rod in the steering mechanism of a motor vehicle, a shock absorber connecting rod, or a connection in the spark and gas control for an internal combustion engine. While I have illustrated and described a preferred form of my invention, modifications may occur to those skilled in the art within its scope and teaching, and I do not care to be limited to the specific construction shown and described or in any manner other than by the claims appended hereto.

I claim:—

1. A link comprising a body part, socket parts near the ends and parts extending beyond the socket parts engageable with securing means, said link comprising two similar longitudinal halves each half integrally including complementary portions of said parts, and means cooperable with said last named parts for holding said halves together.

2. In combination a pair of ball studs, a link for joining said studs having a hollow body part, substantially spherical socket parts engageable with said studs, and parts extending beyond said socket parts presenting wedging surfaces to be engaged by adjustable securing means, said link being formed in two longitudinally extending halves each integrally including complementary portions of said parts, and means engaging said last named parts for effecting a wedging action and adjustably holding the halves of said link in contact with said studs.

3. A link comprising essentially two longitudinally extending equal halves each pressed from sheet stock into channel shape and each having integrally formed socket parts for cooperably engaging external agencies and each having integrally formed inclined extensions lying beyond said socket parts, and securing means including parts engageable with said inclined extensions for effecting a wedging action therewith and holding said halves together.

4. The combination of a pair of ball studs, a link for joining said studs having separable socket parts near its ends engaging the ball parts of the studs, said link having portions extending beyond the socket parts and providing wedging surfaces, means having inclined surfaces adapted to engage said portions and force them together by a wedging action to hold the separate halves of the link upon the ball parts of the studs, and means for moving said last named means to effect said wedging action.

5. The combination of a pair of ball studs, a link for joining said studs having separable socket parts near its ends engaging the ball parts of the studs, said link having portions extending beyond the socket parts with inclined exterior surfaces and means having inclined interior surfaces adapted to overlie the ends of the link and force them together by a wedging action to hold the separate halves of the link upon the ball parts of the studs.

6. A link or tie rod comprising a pair of longitudinally extending halves with channeled end parts, the webs of which converge toward the ends of the link, members having diverging walls disposed over the channeled end parts and engaging the converging bases of the channeled parts, and means for forcing said members upon the ends of the link and holding the separate halves together.

7. A link or tie rod comprising a pair of longitudinally extending halves with channeled end parts, the webs of which converge toward the ends of the link, members encompassing the channeled end parts and engaging the converging bases of the channeled parts, and means for forcing said members upon the ends of the link and holding the separate halves together.

8. A link or tie rod comprising two oppositely facing longitudinally extending generally channeled halves each of which have half socket portions formed near the ends thereof and each of which have converging exterior surfaces beyond the socket portions, means for securing the halves together comprising a member with diverging interior surfaces overlying the converging end portions, and means comprising bolts having heads secured within the converging ends and extending through said members for drawing said members upon the end portions.

9. A tie rod comprising longitudinally halves with channeled end portions of which the bases converge toward the ends of the link, the bases of each of the channeled end portions having apertures, a bolt having a head with parts extending into said apertures and secured against longitudinal movement thereby and extending beyond the ends of the channeled end portions, and means drawn by said bolt and overlying said end portions whereby the halves of the link are held together.

10. A tie rod comprising longitudinal halves with channeled end portions of which the bases converge toward the ends of the link, the bases of each of the channeled end portions having apertures, a bolt having a head with parts extending into said apertures and secured against longitudinal movement thereby and having its head held against rotation by the flanges of the channeled end portions, and means drawn by said bolt and overlying said end portions whereby the halves of the link are held together.

11. A split link comprising longitudinal halves having end portions with inwardly spaced side flanges, washers overlying said end portions and means for securing the halves together including a bolt with a flattened head held against rotation between the said side flanges of the end portions and having a shank extending through said washer and a nut threaded on said bolt engaging said washer for forcing it longitudinally of said link.

12. The combination of a pair of ball studs, a link or tie rod connecting the ball parts of the studs comprising a pair of longitudinally extending halves having socket like portions engaging opposite sides of the ball parts of the studs, each of said halves having channeled parts extending beyond the balls of the studs, means exteriorly engaging the channeled parts for holding the halves together and bolts extending beyond the ends of the link and having their heads adjacent the ball parts of the studs and holding said means upon the channeled ends of the link.

13. In a split link, the combination of pyramidal washers overlying the ends of the link, bolts having their heads held against rotation within the ends of the link and having their shanks extending beyond the ends of the link and through said washers, and a nut for said bolt for forcing said washer onto the ends of the link.

14. In a split link, the combination of a tapering washer overlying one end of the link, a bolt having its head held against rotation and against longitudinal movement within the end of the link and having its shank extending beyond the end of the link and through said washer and a nut for said bolt engaging said washer and drawing it onto the end of the link.

In testimony whereof, I hereunto affix my signature.

JOHN SNEED.